US006847895B2

United States Patent
Nivlet et al.

(10) Patent No.: US 6,847,895 B2
(45) Date of Patent: Jan. 25, 2005

(54) METHOD FOR FACILITATING RECOGNITION OF OBJECTS, NOTABLY GEOLOGIC OBJECTS, BY MEANS OF A DISCRIMINANT ANALYSIS TECHNIQUE

(75) Inventors: Philippe Nivlet, Croissy (FR); Frédérique Fournier, Cormeilles en Parisis (FR); Jean-Jacques Royer, Nancy (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/949,930

(22) Filed: Sep. 12, 2001

(65) Prior Publication Data

US 2002/0052690 A1 May 2, 2002

(30) Foreign Application Priority Data

Sep. 11, 2000 (FR) ............................................ 00 11618

(51) Int. Cl.[7] ............................................ G06F 19/00
(52) U.S. Cl. ................................ 702/2; 702/14; 702/16
(58) Field of Search ................................. 702/2, 16, 14

(56) References Cited

U.S. PATENT DOCUMENTS

| | | | | |
|---|---|---|---|---|
| 4,937,747 A | * | 6/1990 | Koller .......................... 702/12 |
| 5,638,269 A | * | 6/1997 | Fournier et al. ............... 702/14 |
| 5,808,966 A | * | 9/1998 | Calvert et al. ................. 367/73 |
| 5,835,883 A | * | 11/1998 | Neff et al. ....................... 702/7 |
| 5,940,777 A | * | 8/1999 | Keskes .......................... 702/16 |
| 6,052,651 A | * | 4/2000 | Fournier ....................... 702/14 |

* cited by examiner

Primary Examiner—John Barlow
Assistant Examiner—Toan M. Le
(74) Attorney, Agent, or Firm—Antonelli, Terry, Stout & Kraus, LLP (57) ABSTRACT

The invention is a method for facilitating recognition of objects, using a discriminant analysis technique to classify the objects into predetermined categories. A learning base comprising objects that have already been recognized and classified into predetermined categories is formed with each category being defined by variables of known statistical characteristics. A classification function using a discriminant analysis technique, which allows distribution among the categories the various objects to be classified from measurements available on a number of parameters, is constructed by reference to the learning base. This function is formed by determining the probabilities of the objects belonging to the various categories by taking account of uncertainties about the parameters as intervals of variable width. Each object is then assigned, if possible, to one or more predetermined categories according to the relative value of the probability intervals.

27 Claims, 4 Drawing Sheets

FIG. 2

METHOD FOR FACILITATING RECOGNITION OF OBJECTS, NOTABLY GEOLOGIC OBJECTS, BY MEANS OF A DISCRIMINANT ANALYSIS TECHNIQUE

BACKGROUND OF THE INVENTION

1. Field of the Invention

The present invention relates to a method for facilitating recognition of objects by means of a discriminant analysis technique.

2. Description of the Prior Art

Most exploration wells that are drilled in underground formations are not systematically cored since the cost of a coring operation is very high, along with the constraints induced from the drilling operation. For example, in the particular case of log analysis, the method according to the invention allows recognition of the rock at the levels that are not cored. This is an important technical problem because little direct information on the nature of the rocks is generally available. On the other hand, logging measurements are systematically recorded from the moment that a hole is drilled. An abundant source of indirect data on the nature of the geologic formations is thus available, which is essential in order to deduce therefrom the geologic characteristics of the formations encountered while drilling. Logging measurements contain errors linked with the precision of the measuring system and with the recording quality. Thus, if the wall of the borehole is damaged, coupling of the measuring system with the formations will be defective and the measurements will be less reliable. It is important to involve the measuring quality in the determination of the type of the rock in order to better evaluate the reliability of the database which is formed after interpretation of the logs.

The recognition of seismic facies in a reservoir by analysis of the various seismic attributes recorded is a problem. This is also a very important problem because seismic measurements are the only source of information available, which covers all of the reservoir, unlike well measurements that are few and localized.

Various aspects of the prior art are described for example in the following reference documents:

Alefeld G. and Herzberger J., 1983, *Introduction to Interval Computations*; Computer Science and Applied Mathematics No.42, Academic Press, New York;

Dequirez P.-Y., Fournier F., Feuchtwanger T., Torriero D., 1995, *Integrated Stratigraphic and Lithologic Interpretation of the East-Senlac Heavy Oil Pool*; SEG, 65$^{th}$ Annual International Society of Exploration Geophysicists Meeting, Houston, Oct. 8–13 1995, Expanded Abstracts, CH1.4, pp. 104–107;

Epanechnikov V. A., 1969, *Nonparametric Estimate of a Multivariate Probability Density*; Theor. Probab. Appl., vol. 14, p. 179–188;

Hand D. J., 1981, *Discrimination and Classification*; Wiley Series in Probabilities and Mathematical Statistics, John Wiley & Sons, Chichester;

Jaulin L., 2000, *Le Calcul Ensembliste par Analyse par Intervalles et Ses Applications*; Mémoire d'Habilitation à Diriger des Recherches;

Kolmogorov A. N., 1950, *Foundation of the Theory of Probability*; Chelsea Publ. Co., New York;

Luenberger D. G., 1969, *Optimization by Vector Space Methods*; Series in Decision and Control, John Wiley & Sons, Chichester;

Moore R. E., 1969, *Interval Analysis*; Prenctice-Hall, Englewood Cliffs;

Pavec R., 1995, *Some Algorithms Providing Rigourous Bounds for the Eigenvalues of a Matrix*; Journal of Universal Computer Science, vol. 1 No.7, p. 548–559;

Walley P., 1991, *Statistical Reasoning with Imprecise Probabilities*; Monographs on Statistics and Applied Probabilities No.42, Chapman and Hall, London.

Discriminant analysis is a known technique for recognition of geologic objects in underground formations. The objects are defined by a set of data of a certain number of variables or characteristics. For example, from a set of logs, it may be desired to predict the type of rock or of lithofacies that will be encountered for each depth point of a well, with reference to a knowledge base. This type of base is formed by learning from configurations known through observations or prior measurements performed for example on core samples taken at various well depth levels through the formation, thus allowing connection of typical depth points to lithofacies or rock types existing in the well. An analysis method of this type is described in U.S. Pat. No. 6,052,651 filed by the assignee.

Another example is given by the supervised seismic facies analysis methodology described for example by Dequirez et al., 1995, mentioned above. Portions of seismic traces, or seismic samples, are characterized by a set of parameters referred to as seismic attributes, and these attributes are used to classify traces in categories having a geologic sense. A learning stage is carried out beforehand on typical seismic traces obtained in the vicinity of wells representative of the geologic categories to be recognized, from well surveys, for example, of wells producing gas in relation to wells producing oil, or wells where the reservoir is porous in relation to wells where the reservoir is compact, or wells where the reservoir is predominantly sandy, in relation to wells where the reservoir is predominantly salty, etc.

The discriminant analysis technique however has certain limits. In particular, it does not allow accounting for uncertainties about the values of the variables used to classify the objects. This is a problem since these uncertainties are real. The measurements, whether logging or seismic measurements, are imprecise. One of the causes for this imprecision is linked with the tools used to obtain and to process the measurements. Another cause is linked with the experimental conditions. Big measurement differences can be observed for example if the logging sonde is in front of a damaged well wall or of an invaded formation, etc.

SUMMARY OF THE INVENTION

The method according to the invention facilitates recognition of objects by taking into account uncertainties about parameters describing the objects, using a discriminant analysis technique for classifying the objects in predetermined categories. The method comprises:

forming a learning base comprising all the objects that have already been recognized and classified in predetermined categories with each object being defined by variables of known statistical characteristics;

constructing, by reference to the learning base, a classification function using a discriminant analysis technique, allowing distribution, among the categories, the objects to be classified from available measurements on parameters, the function being formed by determining probability intervals of the objects belonging to the categories by taking into account uncertainties about the parameters, in a form of intervals of variable width; and assigning each object to at least one of the predetermined categories if possible, according to an extent of the probability intervals and to the overlap of the probability intervals.

According to a first embodiment, the classification function is constructed by means of a parametric discriminant analysis technique where the parameters follow a multi-Gaussian probability law.

According to a second embodiment, the classification function is constructed by means of a non-parametric discriminant analysis technique where the parameters follow an experimental law estimated, for example, by a kernel technique.

In a first application to geology where geologic objects are considered in an underground zone, the learning base is formed from geologic core samples taken from at least one well drilled through the formation, by defining therefrom learning classes corresponding to different rock types, the geologic objects to be classified being associated with logs obtained in wells through the formation and, for various depth points, the probability of the objects belonging which are encountered at each depth point to each predetermined learning class is evaluated, in a form of an interval whose boundaries depend on measurements at the depth point being considered and on the uncertainties about the measurements, and the geologic object encountered at this depth point is assigned, if possible, to at least one of the learning classes according to the relative extent of the probability intervals and to the overlap of the probability intervals.

The method according to the invention finds applications in many fields. It can for example be used to recognize geologic objects that constitute an underground formation, which can be distinguished by the nature or the form thereof. It facilitates for example recognition of petroleum reservoirs by analysis of the facies of the seismic traces, by characterization of rock types, of electrofacies, by log analysis, etc. Although the description hereafter lies within this geologic scope, the method can also be used in other spheres such as image processing, signal processing (remote sensing, medical imagery, etc.).

In cases where a set of seismic traces relative to the underground formation, obtained by seismic exploration, is available, the learning base is formed from a first set of seismic traces obtained, in a vicinity of at least one well drilled through the formation, by measurements, and corresponding typically to different types of reservoirs, and the probability of belonging to each predetermined learning class of seismic traces of a second set obtained in other places than the vicinity of the or of each well is evaluated as an interval with boundaries depending on the characteristics of the measurements of the seismic traces of the two sets and on the uncertainties about these measurements, and the geologic object encountered is assigned to at least one of the learning classes according to the relative extent of the associated interval in relation to all of the intervals.

The method can of course be applied in other applications such as pattern recognition in image processing, signal processing (medical imagery, remote sensing, etc.).

The method according to the invention, by taking into account the quality of the measurements available, provides a better evaluation of the reliability of recognition of the objects from these measurements, and a more realistic classification since the measurement uncertainties are involved in the process.

BRIEF DESCRIPTION OF THE DRAWINGS

Other features and advantages of the method according to the invention wilt be clear from reading the description hereafter of a non limitative example, with reference to the accompanying drawings wherein.

DETAILED DESCRIPTION OF THE PREFERRED EMBODIMENTS

In broad outline, the method according to the invention comprises constructing a function allowing classification of objects in predetermined categories. This function is formed from the statistical characteristics of the variables that describe objects that have already been recognized (that whose category is known), which form a learning set. The classification function thus constructed is based on calculation of the probabilities of the objects belonging to the classes, considering the measurements of p variables available on these objects. The object can for example be assigned to the category for which the probability of belonging is the most probable. In the method, uncertainties about the parameters are taken into account in a form of an interval of possible variation of the measurement of each variable on a certain object The method according to the invention allows propagation of the possible intervals, for the values of the various measurements, in the classification probability calculation. Thus, what is obtained for each category considered is not a probability of classification of the object in this category, but a probability interval. The object can then be assigned from the moment that one of these probability intervals is greater than the others. The analysis of the probability intervals also allows evaluation of the quality of the prediction of the learning categories, as well as the degree of separation of these categories provided by the variables, while involving the uncertainty about the experimental measurements of these variables.

The method according to the invention is based on a particular application of the concept of interval arithmetic, which is explained hereafter.

Interval arithmetic, as described in detail in the aforementioned document: Moore R. E., 1969, allows extending the usual mathematical operators to interval calculations. The purpose is to provide a guaranteed frame for the results, considering the input intervals. Thus, rule (1) hereafter defines the extension of arithmetic operations to two intervals $x=[x^-;x^+]$ and $y=[y^-;y^+]$.

$$\begin{cases} x+y = \left[x^- + y^-; x^+ + y^+\right] \\ x-y = \left[x^- - y^+; x^+ - y^-\right] \\ x \cdot y = [\text{Min}\{x^- \cdot y^-; x^- \cdot y^+; x^+ \cdot y^-; x^+ \cdot y^+\}; \text{Max}\{x^- \cdot y^-; x^- \cdot y^+; x^+ \cdot y^-; x^+ \cdot y^+\}] \\ \frac{1}{x} = \left[\frac{1}{x^+}; \frac{1}{x^-}\right] \\ \frac{x}{y} = x \cdot \frac{1}{y} \end{cases} \quad (1)$$

For any function f, equation (2) defines its extension to the intervals, referred to as inclusion function $f_{[\ ]}$.

$$f_{[\ ]}(x) \supseteq \{y=f(x)|x \in x\} \quad (2)$$

Obtaining these inclusion functions generally poses no problems. Among these functions, the natural inclusion function is constructed using only calculation rules (1) and some complementary definitions concerning the elementary functions. For example, equation (3) defines the extension of the exponential:

$$\exp_{[\ ]}(x)=[\exp(x^-)); \exp(x^+)] \quad (3)$$

However, natural inclusion functions are generally not optimal, in the sense that inclusion (2) is not an equality. The purpose of interval arithmetic is then to generate an inclusion function whose boundaries are as limited as possible.

In order to complete these base definitions, an extension of the comparison operators to the intervals [equation (4)] is defined.

$$x > y \Leftrightarrow x^- > y^+ \quad (4)$$

It can be noted that the latter definition allows comparison of unconnected intervals. Overlapping intervals are referred to as indissociable.

All the concepts of interval arithmetic are applied in the method according to the invention to frame probabilistic objects. Now, probability intervals cannot strictly establish the truth of axioms referred to as Kolmogorov's axioms, which define a probability and are published in the aforementioned reference, Kolmogorov, 1950. It is therefore necessary to generalize the probability theory to the intervals. This generalization is described by Walley in the aforementioned publication, under the theory name of imprecise probabilities. The main two axioms whose truth is to be established by an imprecise probability $p_{[\ ]}$ are explained hereafter.

$p_{[\ ]}$ is a positive definite measurement; i.e., for any event A, $$0 \leq p^-_{[\ ]}(A) \leq p^+_{[\ ]}(A) \leq 1; \quad (5)$$

$p_{[\ ]}$ establishes the truth of a coherence axiom; i.e., for any set of independent events $A_i$, there is a function p defined on this set of events, which establishes the truth of Kolmogorov's axioms, and such that, for all the $A_i$, $$p^-_{[\ ]}(A_i) \leq p(A_i) \leq p^+_{[\ ]}(A_i). \quad (6)$$

The object recognition method described below is, in broad outline, similar to a discriminant analysis algorithm.

In the description hereafter, one of the N predetermined categories is denoted by $C_i$. The jth learning interval of class $C_i$, consisting of a vector of p measurement intervals, is denoted by $x_{ij}=(x_{ij}^{(I)}; \ldots; x_{ij}^{(k)}; \ldots; x_{ij}^{(P)})$. The current interval of the attribute space is denoted by $x=(x^{(I)}; \ldots; x^{(k)}; \ldots; x^{(P)})$. Finally, $x^c$ denotes the centre of any interval x.

The stages of the object recognition algorithm are as follows:

1—Calculation of the Conditional Probability Density Functions $p_{[\ ]}(x|C_i)$ The probability density function can be estimated using either a non-parametric method or a parametric method. With a non-parametric method, the advantage is a better identification of the structure of each learning class $C_i$. However, use of a non-parametric method requires the size of learning class $C_i$ to be sufficient to allow reliable identification of this structure. With a parametric method, a hypothesis has to be made on the structure of learning class $C_i$, which amounts to supposing that this class follows a predetermined distribution law, for example a Gaussian law [equation (7)]:

$$p(x/C_i) = \frac{1}{(2\pi)^{P/2}|\Sigma|^{1/2}} e^{-\frac{1}{2}(x-\mu)/\Sigma^{-1}(x-\mu)} \quad (7)$$

where $\mu$ represents the center of inertia of learning class $C_i$, and $\Sigma$ its variance-covariance matrix characteristic of the dispersion thereof.

Described successively below as the extensions of the non-parametric method of estimating the probability density function and the Gaussian parametric method [equation (7)].

1-a Non-parametric Method

In the non-parametric method, the conditional density is estimated, for example means of the kernel method. The non-parametric method consists in applying to the intervals the formula for calculating the conditional probability density function by means of Epanechnikov's kernel method described in the aforementioned reference:

$$p_{[]}(x|C_i) = \frac{1}{n_i h^p} \sum_{j=1}^{n_j} K_{[]}\left(\frac{x-x_{ij}}{h}\right) \quad (8)$$

where h represents the width of the passband of the kernel, $n_i$ the size of learning class $C_i$. The kernel is written as follows:

$$K_{[]}\left(\frac{x-x_{ij}}{h}\right) = \begin{cases} \frac{1}{2N_p}(p+2)\left(1 - \frac{\sum_{k=1}^{p}\left(x^{(k)} - x_{ij}^{(k)}\right)^2}{h^2}\right) & \text{if } |x - x_{ij}| < h \\ 0 & \text{otherwise} \end{cases} \quad (9)$$

Each quadratic term of the sum is independent of the others. The expression of the lower and upper boundaries of these terms is expressed as $Q=(x^{(k)}-x^{(k)}_{ij})+)/h^2$.

$$\begin{cases} Q^- = \begin{cases} \dfrac{(x^{c(k)} - x_{ij}^{(k)-})^2}{h^2} & \text{if } x_{ij}^{(k)c} \le x^{(k)c} \le x_{ij}^{(k)-} - (x^{(k)c} - x^{(k)-}) + h \\ \dfrac{(x^{c(k)} - x_{ij}^{(k)+})^2}{h^2} & \text{if } x_{ij}^{(k)+} - (x^{(k)+} - x^{(k)c}) - h \le x^{(k)c} \le x_{ij}^{(k)c} \\ 1 & \text{otherwise} \end{cases} \\ Q^+ = \begin{cases} \dfrac{(x_{ij}^{(k)-} - x^{(k)-})^2}{h^2} & \text{if } x_{ij}^{(k)-} - (x^{(k)c} - x^{(k)-}) - h \le x^{(k)c} \le x_{ij}^{(k)-} - (x^{(k)c} - x^{(k)-}) \\ 0 & \text{si } x_{ij}^{(k)-} - (x^{(k)c} - x^{(k)-}) \le x^{(k)c} \le x_{ij}^{(k)+} + (x^{(k)+} - x^{(k)c}) \\ \dfrac{(x^{(k)+} - x_{ij}^{(k)+})^2}{h^2} & \text{if } x_{ij}^{(k)+} + (x^{(k)+} - x^{(k)c}) \le x^{(k)c} \le x_{ij}^{(k)+} - (x^{(k)+} - x^{(k)c}) + h \\ 1 & \text{otherwise} \end{cases} \end{cases} \quad (10)$$

An equivalent calculation is made if another non-parametric estimator of the conditional density is used as the estimator of the k nearest neighbors.

1b Parametric Method

Extension of equation (7) can theoretically be done by means of calculation rules (1), but their direct use leads to overestimating the variation intervals of the probability densities of equation (11).

$$p_{[]}(x_{[]}/C_i) = \dfrac{1}{(2\pi)^{P/2}|\Sigma_{[]}|^{1/2}} e^{-\frac{1}{2}(x_{[]}-\mu_{[]})/\Sigma_{[]}^{-1}(x_{[]}-\mu_{[]})} \quad (11)$$

The calculation algorithm herein improves the frame that may be obtained by applying calculation rules (1). The various stages thereof are:

Calculation of the Intervals of Variation of Parameters $\mu$ and $\Sigma$ of Gaussian Law (11)

This calculation finds the minimum and the maximum of each term of matrix $\Sigma$ when points $x_{ij}$ of learning class $C_i$ vary within their intervals of possible values $x_{ij}$. It is carried out using a constrained optimization method such as the projected gradient method.

$$\begin{cases} \Sigma_{kl}^- = \min_{x_{ij} \in x_{ij}, \forall j} \left\{ \sum_j (x_{ij}^{(k)} - \mu_i^{(k)})(x_{ij}^{(l)} - \mu_i^{(l)}) \right\} \\ \Sigma_{kl}^+ = \max_{x_{ij} \in x_{ij}, \forall j} \left\{ \sum_j (x_{ij}^{(k)} - \mu_i^{(k)})(x_{ij}^{(l)} - \mu_i^{(l)}) \right\} \end{cases} \forall (k,l) = 1 \ldots p \quad (12)$$

Diagonalization of Interval Matrix $\Sigma_{[\ ]}$

This stage consists in framing interval matrix $\Sigma_{[\ ]}$ by a matrix $\Sigma^*_{[\ ]}$ similar thereto, but diagonal. In other words, $\Sigma 8_{[\ ]}$ must meet equation (13):

$$\Sigma^*_{[\ ]} \subseteq R^1_\theta \Sigma_{[\ ]} R_\theta \quad (13)$$

where $R_\theta$ is a rotation matrix.

The matrix $\Sigma_{[\ ]}$ is first modified by trying to convert the matrix $\Sigma_{[\ ]}$ to a matrix $\Sigma'_{[\ ]} = R^1_\theta \Sigma_{[\ ]} R_\theta$ whose out-of-diagonal terms vary within intervals that are as small as possible. Jacobi's interval method is used therefore. The out-of-diagonal intervals of $\Sigma'_{[\ ]}$ are then replaced by 0. This operation necessarily leads to an increase in the size of the variation intervals of the diagonal terms of $\Sigma'_{[\ ]}$.

In short, at the end of this second stage, a frame is found for matrix $\Sigma_{[\ ]}$ in form of a matrix $\Sigma^*_{[\ ]}$, without being affected by interval repetition problems. However, direct use of matrix $\Sigma^*_{[\ ]}$ in equation (11) still leads to overestimating the variation intervals of the conditional probability densities.

Optimization of the Variation Intervals of the Conditional Probability Densities In order to better frame the variation intervals of the conditional probability densities, the variation domain of $\mu$ is regularly divided into $n_s$ subdomains $\mu_{k[\ ]}$. For each subdomain $\mu_{k[\ ]}$ thus formed, interval arithmetic rules (1) are applied. This operation leads to an interval function $p_{k[\ ]}(x/C_i)$. After forming the $n_s$ interval functions, the function $p_{[\ ]}(x/C_i)$ is calculated which is the union of all the interval functions $p_{k[\ ]}(x_{[\ ]}/C_i)$ formed before:

$$P_{[\ ]}(x/C_i) = \bigcup_k p_{k[\ ]}(x/C_i) \quad (14)$$

Function $p_{[\ ]}(x_{[\ ]}/C_i)$ thus calculated is a guaranteed frame for the variation intervals of the conditional probability density, but whose boundaries are better than without the subdomains formed.

After calculating the variation intervals of the conditional probability densities, the a posteriori probabilities $p_{[\ ]}(C_i|x)$ is calculated.

2—Calculation of the a Posteriori Probabilities $p_{[\ ]}(C_i|x)$

In this stage, the intervals Bayes' rule is applied, which is well-known in statistics:

$$p_{[]}(C_i|x) = \dfrac{p(x|C_i) \cdot p(C_i)}{\sum_{i=1}^{p} p(x|C_i) \cdot p(C_i)_{[]}} \quad (15)$$

By transforming the previous equation and by applying rules (1), the optimum expression is obtained hereafter of the a posteriori probabilities:

$$p_{[]}(C_i|x) = \left[ \left(1 + \sum_{l \ne i} \dfrac{p^+(x|C_i)p^+(C_i)}{p^-(x|C_i)p^-(C_i)} \right)^{-1}; \right. \quad (16)$$

$$\left. \left(1 + \sum_{l \ne i} \dfrac{p^-(x|C_i)p^-(C_i)}{p^+(x|C_i)p^+(C_i)} \right)^{-1} \right]$$

These interval probabilities establish the truth of the imprecise probabilities axioms.

3—Classification of Interval x in the Likeliest Class or Classes

The classification mode used is an extension of the maximum likelihood rule. It compares the various a posteriori probability intervals $p_{[\ ]}(C_i|x)$. The various intervals are therefore first arranged in decreasing order of $p^+(C_i|x)$ or, which is equivalent, in decreasing order of quantities $p^+(x|C_i)p^+(C_i)$:

$$p^+(x|C_{i1})p^+(C_{i1}) \geq p^+(x|C_{i2})p^+(C_{i2}) \geq \ldots \geq p^+(x|C_{iN})p^+(C_{iN}) \quad (17)$$

Then, by applying the rule of comparison on the intervals, if intervals $p_{[\ ]}(C_{i1}|x)$ and $p_{[\ ]}(C_{i2}|x)$ are unconnected, $(p^-(C_{i1}|x) \geq p^+(C_{i2}|x))$, interval x is assigned to class $C_{i1}$. In the opposite case, the algorithm cannot distinguish classes $C_{i1}$ and $C_{i2}$ in x. The previous comparison test is then repeated between classes $C_{i1}$ and $C_{i3}, \ldots, C_{i1}$ until intervals $p_{[\ ]}(x|C_{i1}) \cdot p_{[\ ]}(C_{i1})$ and $P_{[\ ]}(x|C_{i1}) \cdot p_{[\ ]}(C_{i1})$ are unconnected.

In conclusion, the algorithm allows propagation of the measurement uncertainties within the scope of the discriminant analysis. The result is a fuzzy classification of the observations.

II) Validation of the Method: Case Study

The method according to the invention was applied to logs obtained in wells for determining rock types such as those shown in FIGS. 1 to 4.

Figure 1:
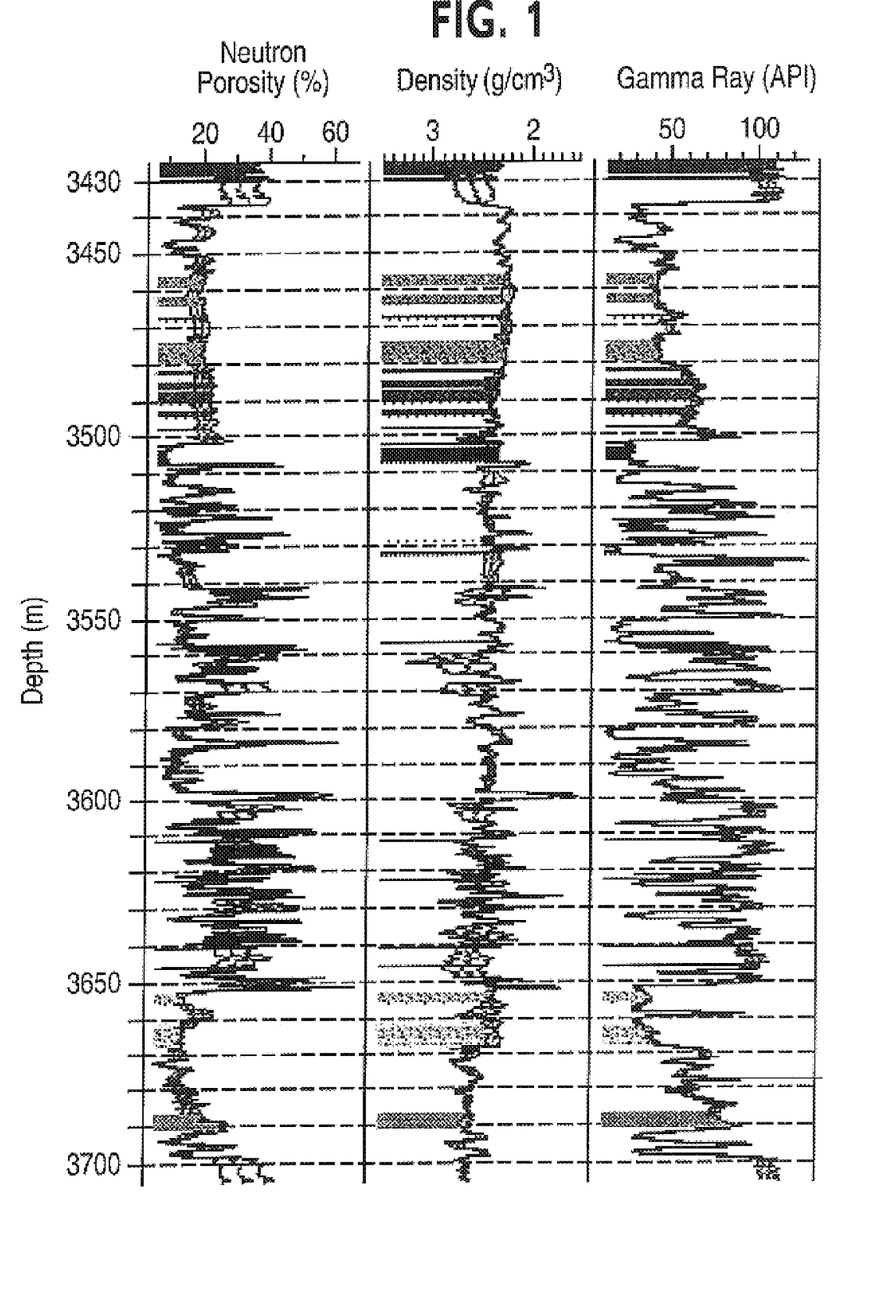
FIG. 1 shows examples of logs available for the well studied, obtained by means of a gamma-ray spectral logger, a density measuring sonde and a neutron (porosity) sonde, and the uncertainties linked with these measurements, as well as the learning depth points.

FIG. 1 shows logs available for the reference well on which learning samples were defined from adjustment of the logging response to a description of core samples. Three logs are available, which were obtained by means of a gamma-ray spectral logger, a density measuring sonde and a neutron (porosity) sonde. Each curve is shown with its uncertainty, this uncertainty being linked, on the one hand, with the nature of the acquisition device and, on the other hand, with the quality of the borehole wall.

Figure 2:
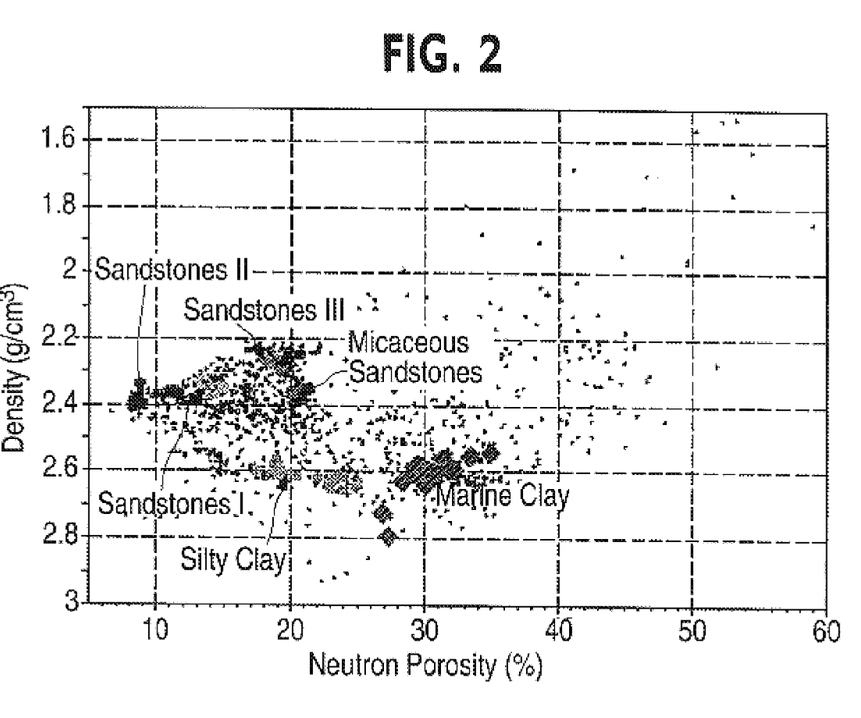
FIG. 2 shows an example of a crossed density/neutron-porosity diagram showing the learning set and the points to be classified.

FIG. 2 shows, with different symbols, the learning points of the various lithologic categories to be recognized from the logs, in a crossed density/neutron-porosity diagram. The zones of this diagram are defined in terms of mineralogy and of porosity. It can thus be observed that the learning set has three sandstone categories, according to their porosity, of one micaceous sandstone category and of two clay categories (marine clay and silty clay). The smaller symbols correspond to depth points that do not belong to the learning set, i.e. depth points who are not known for belonging to the category, but that one would like to predict from the logs.

Figure 3:
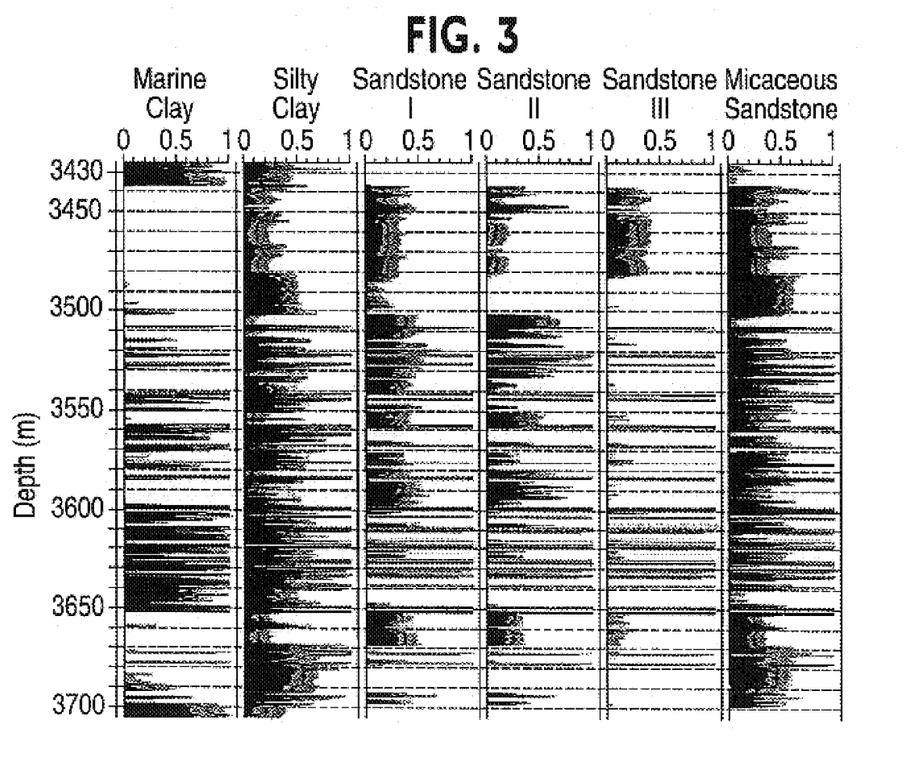
FIG. 3 shows examples of intervals of probability of belonging to each category.

FIG. 3 shows, along the well and for the six categories considered, the probability interval of belonging to each category, calculated by means of the method according to the invention from the three available logs and from the uncertainties thereof.

Figure 4A:
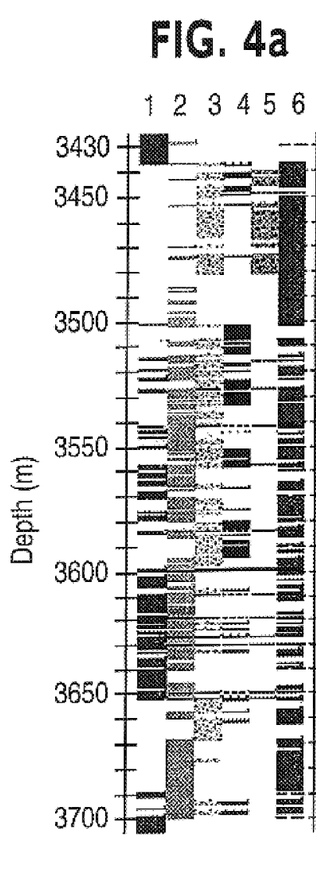
FIGS. 4a and 4b show possible assignments of points along a well to the various geologic classes (FIG. 4a) and the most probable assignments (FIG. 4b).

FIG. 4a shows, along the well, the possible assignments to the various geologic classes, from the probability intervals calculated by means of the method according to the invention, and shown in FIG. 3. The geologic column on the right is a synthesis of these possible assignments where only the most reliable assignments appear.

The learning stage is carried out by using depth points for which the type of the rock is known from core samples. For the reservoir studied, there are about twenty wells for which gamma-ray, density and neutron-porosity measurements were carried out. A single well is cored, which will thus be used as the calibration well, or reference well, for selection of the learning depth points that will allow calibration of the classification function.

Figure 4B:
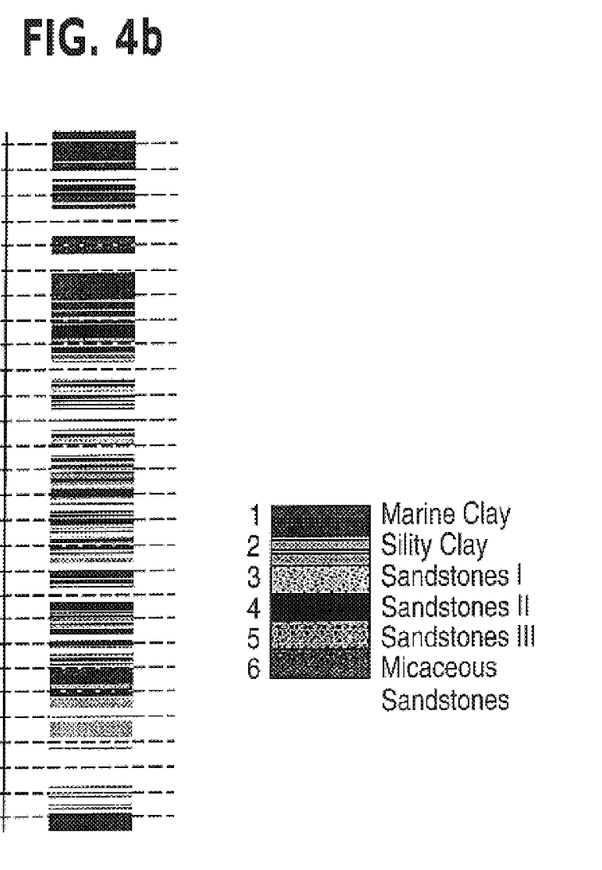

The six learning classes corresponding to different rock types (both lithologic type and petrophysical characteristics) are rather well discriminated in the space of the three parameters considered, as partly shown in the density, neutron-porosity plane. There are enough learning points per class (about 60) to envisage using a non-parametric discriminant analysis technique to construct the classification function. In order to take into account, in the classification, the uncertainties about the logs, the interval arithmetic algorithm that has been developed is used. For a given depth point, described by the fuzzy logs, the probability of belonging to each learning class is evaluated. This probability is evaluated in the form of an interval defined by a lower boundary and an upper boundary. The probability of belonging to the class considered, calculated by conventional discriminant analysis, is shown in FIG. 3, as well as the frame formed by the two boundaries deduced from the interval arithmetic. These boundaries take into account, on the one hand, the log values at the depth point considered and, on the other hand, the uncertainties about the logs at this depth point. When one of the probability intervals is entirely greater than those of the other classes, it is then possible to assign the point to the class with the highest probability interval. In the opposite case, when k probability intervals overlap, there are k possible assignments for the point. The multiplicity of the possible assignments is due to the uncertainties about the logs used for determining the geologic class of the point. The different possible assignments of each depth point are represented along the well in FIG. 4. The most reliable zones for prediction are those where only one, possibly two assignments are possible. The zones where multiple assignments exist are zones for which the logs, considering the errors they contain, do not allow determination of the geologic belonging class.

The method of the invention allows prediction of belonging to predetermined categories, which often have a geologic significance, more realistically since the errors or the uncertainties relative to the discriminant parameters are taken into account in the assignment process. This method thus leads to more reliable assignment of objects to learning classes, accompanied by a more accurate quantification of the uncertainties linked with this prediction.

What is claimed is:

1. A method of recognition of objects, taking into account uncertainties about parameters describing the objects, by classifying the objects into predetermined categories, by reference to a learning base formed by collecting data obtained by determinations relative to other objects that have already been recognized and classified into predetermined categories, each recognized object being defined by variables of known statistical characteristics and a classification function, the method comprising:

forming the classification function by determining probability intervals of the objects belonging to the predetermined categories which account for uncertainties about the parameters using intervals of variable width; and assigning each object to at least one of the predetermined categories according to an extent of the probability intervals or an overlap of the probability intervals.

2. A method as claimed in claim 1, comprising:

forming the classification function using a parametric discriminant analysis technique for which the parameters follow an interval multi-Gaussian probability law.

3. A method as claimed in claim 1, comprising:

forming the classification function using a non-parametric discriminant analysis technique for which the parameters follow an estimated interval experimental law.

4. A method as claimed in claim 3, wherein:

the experimental law is estimated using a kernel technique.

5. A method as claimed in claim 1, wherein:
the objects are geologic objects in an underground formation, the learning base is formed from geologic samples taken from at least one well drilled through the underground formation, by defining therefrom learning classes corresponding to different rock types, the geologic objects to be classified are associated with logs obtained in wells through the underground formation, and, for depths of the wells, a probability of the objects which are encountered at each depth point belonging to each learning class is evaluated in a form of an interval with boundaries depending on the logs at a considered depth and on uncertainties about the determination, and each geologic object encountered at the considered depth is assigned to at least one of the learning classes according to a relative extent of an associated probability interval in relation to all of the intervals.

6. A method as claimed in claim 2, wherein:
the objects are geologic objects in an underground formation, the learning base is formed from geologic samples taken from at least one well drilled through the underground formation, by defining therefrom learning classes corresponding to different rock types, the geologic objects to be classified are associated with logs obtained in wells through the underground formation, and, for depths of the wells, the probability of the objects which are encountered at each depth to each learning class is evaluated in a form of an interval with boundaries depending on the logs at a considered depth and on uncertainties about the determination, and each geologic object encountered at the considered depth is assigned to at least one of the learning classes according to a relative extent of an associated probability interval in relation to all of the intervals.

7. A method as claimed in claim 3, wherein:
the objects are geologic objects inn an underground formation, the learning base is formed from geologic samples taken from at least one well drilled through the underground formation, by defining therefrom learning classes corresponding to different rock types, the geologic objects to be classified are associated with logs obtained in wells through the underground formation, and, for depths of the wells, the probability of the objects which are encountered at each depth to each learning class is evaluated in a form of an interval with boundaries depending on the logs at a considered depth and on uncertainties about the determination, and each geologic object encountered at the considered depth is assigned to at least one of the learning classes according to a relative extent of an associated probability interval in relation to all of the intervals.

8. A method as claimed in claim 4, wherein:
the objects are geologic objects in an underground formation, the learning base is formed from geologic samples taken from at least one well drilled through the underground formation, by defining therefrom learning classes corresponding to different rock types, the geologic objects to be classified are associated with logs obtained in wells through the underground formation, and, for depths of the wells, the probability of the objects which are encountered at each depth to each learning class is evaluated in a form of an interval with boundaries depending on the logs at a considered depth and on uncertainties about the determination, and each geologic object encountered at the considered depth is assigned to at least one of the learning classes according to a relative extent of an associated probability interval in relation to all of the intervals.

9. A method as claimed in claim 1, wherein:
the objects are geologic objects in an underground formation relating to a set of seismic traces obtained by seismic exploration, the learning base is formed from a first set of measured seismic traces, the traces are obtained in a vicinity of at least one well drilled through the underground formation corresponding to different reservoir types, and a probability of belonging to each predetermined learning class of the seismic traces of a second set obtained in other places than a vicinity of each well is evaluated as an interval with boundaries depending on characteristics of the measured seismic traces of the two sets of seismic traces and uncertainties about the measured seismic traces, and an geologic encountered object is assigned to at least one of the learning classes according to a relative extent of an associated interval in relation to the set of intervals.

10. A method in accordance with claim 1, wherein the determinations are measurements.

11. A method in accordance with claim 1, wherein the determinations are observations.

12. A method in accordance with claim 2, wherein the determinations are measurements.

13. A method in accordance with claim 3, wherein the determinations are measurements.

14. A method in accordance with claim 4, wherein the determinations are measurements.

15. A method in accordance with claim 4, wherein the determinations are measurements.

16. A method in accordance with claim 5, wherein the determinations are measurements.

17. A method in accordance with claim 6, wherein the determinations are measurements.

18. A method in accordance with claim 7, wherein the determinations are measurements.

19. A method in accordance with claim 8, wherein the determinations are measurements.

20. A method in accordance with claim 2, wherein the determinations are observations.

21. A method in accordance with claim 3, wherein the determinations are observations.

22. A method in accordance with claim 4, wherein the determinations are observations.

23. A method in accordance with claim 5, wherein the determinations are observations.

24. A method in accordance with claim 6, wherein the determinations are observations.

25. A method in accordance with claim 7, wherein the determinations are observations.

26. A method in accordance with claim 8, wherein the determinations are observations.

27. A method in accordance with claim 9, wherein the determinations are observations.

* * * * *